United States Patent
Fujiwara et al.

[11] Patent Number: 6,073,067
[45] Date of Patent: Jun. 6, 2000

[54] METHOD FOR CONTROLLING A REAR WHEEL STEERING DEVICE OF A FRONT AND REAR WHEEL STEERING VEHICLE

[75] Inventors: Yukihiro Fujiwara; Osamu Tsurumiya, both of Saitama-ken, Japan

[73] Assignee: Honda Giken Kogyo Kabushiki Kaisha, Tokyo, Japan

[21] Appl. No.: 08/665,720

[22] Filed: Jun. 18, 1996

[30] Foreign Application Priority Data

Jul. 7, 1995 [JP] Japan .................................. 7-196100

[51] Int. Cl.$^7$ ...................................................... B62D 5/00
[52] U.S. Cl. ........................... 701/41; 180/410; 180/415; 180/445
[58] Field of Search ....................... 701/41, 42; 180/236, 180/408–417, 445, 446; 280/91.1

[56] References Cited

U.S. PATENT DOCUMENTS

| | | | |
|---|---|---|---|
| 4,625,822 | 12/1986 | Nakamura et al. | 180/415 |
| 4,884,647 | 12/1989 | Mimuro et al. | 701/41 |
| 4,901,811 | 2/1990 | Uno et al. | 180/414 |
| 4,939,653 | 7/1990 | Tsurumiya et al. | 701/41 |
| 4,999,003 | 3/1991 | Koishi et al. | 180/236 |
| 5,047,939 | 9/1991 | Ito et al. | 701/41 |
| 5,430,650 | 7/1995 | Susuki et al. | 701/42 |
| 5,521,820 | 5/1996 | Wakamatsu et al. | 701/42 |

*Primary Examiner*—Gary Chin
*Attorney, Agent, or Firm*—Carrier, Blackman & Associates, P.C.; Joseph P. Carrier; William D. Blackman

[57] ABSTRACT

In a method for controlling a rear wheel steering device of a front and rear wheel steering vehicle, the target computed rear wheel steering angle is defined as a value smaller than the normal computed target rear wheel steering angle when the load of the steering actuator is greater than a prescribed threshold value, and which is otherwise equal to the normal computed target rear wheel steering angle, and the steering actuator is actuated according to a deviation of the actual rear wheel steering angle from the modified computed target rear wheel steering angle, typically with a duty ratio control. Thus, the rear wheel steering device can be operated in a satisfactory manner even when the output capacity of the actuator for the rear wheel steering device is limited, and the steering load is high. A high load condition typically occurs when the vehicle is stationary and when the steering wheel is turned sharply while the vehicle is traveling over a road surface having a high frictional coefficient.

5 Claims, 7 Drawing Sheets

METHOD FOR CONTROLLING A REAR WHEEL STEERING DEVICE OF A FRONT AND REAR WHEEL STEERING VEHICLE

TECHNICAL FIELD

The present invention relates to a method for controlling a rear wheel steering device of a front and rear wheel steering vehicle.

BACKGROUND OF THE INVENTION

In the field of front and rear wheel steering vehicles, it was previously proposed to use an electric actuator such as an electric servo motor to actuate the rear wheel steering device of the vehicle. In such a vehicle, the load or the resistance which the rear wheel steering device encounters as it is actuated becomes greater as the traveling speed of the vehicle decreases, and the steering load when the vehicle is stationary could be more than twice greater than that when the vehicle is at a cruising speed. Also, when the vehicle is rapidly steered on a road surface demonstrating a high frictional coefficient, the steering load could be substantially greater than that under normal condition.

The actuator for the rear wheel steering device is therefore required to have a sufficient capacity to meet the need under the highest possible load condition. However, such a high load condition is rarely encountered. In short, the conventional electric rear wheel steering device had to be equipped with a relatively expensive actuator to meet the need which seldom arises. Also, the size and weight of the rear wheel steering device were also objectionable.

It was proposed in the copending patent application Ser. Nos. 08/147,825 (now U.S. Pat. No. 5,521,820) to disable the integral control when the steering load has exceeded a certain threshold level so that the rear wheel steering device is controlled solely by the proportional and differential feedback control and the feed-forward control. According to this previous proposal, when the steering load is high, by disabling the integral control, some offset error will be created, but the actuator is prevented from overcompensating for the large accumulated error which would be otherwise created due to the lack of the power of the actuator. However, under a high steering load condition, the actual steering angle tends to be indeterminate, and this could cause the vehicle operator to feel the steering system unreliable. For instance, when the vehicle operator starts out the vehicle from a stationary condition while continually steering the rear wheels, the steering load of the rear wheel steering device which was initially high immediately falls below the threshold level as soon as the vehicle starts moving. In such situation, the steering angle of the rear wheels at the time when the vehicle actually starts moving tends to be indeterminate, and this could create an unfavorable impression of the handling of the vehicle.

BRIEF SUMMARY OF THE INVENTION

In view of such problems of the prior art, a primary object of the present invention is to provide a method for controlling the rear wheel steering device of a front and rear wheel steering vehicle which can reduce the power requirement of the rear wheel steering device without substantially impairing the performance of the device.

A second object of the present invention is to provide a method for controlling the rear wheel steering device which allows the actuator therefor to be compact in size and economical to manufacture.

A third object of the present invention is to provide a method for controlling the rear wheel steering device which can reduce the power requirement of the rear wheel steering device without substantially affecting the handling of the rear wheel steering device.

According to the present invention, these and other objects can be accomplished by providing a method for controlling a rear wheel steering device of a front and rear wheel steering vehicle, comprising the steps of: computing a target rear wheel steering angle according to an operating condition of a vehicle; detecting an actual rear wheel steering angle; detecting a load of a steering actuator of the rear wheel steering device; defining a modified computed target rear wheel steering angle which is smaller than the computed target rear wheel steering angle when the load of the steering actuator is greater than a prescribed threshold value, and which is otherwise equal to the computed target rear wheel steering angle; and actuating the steering actuator of the rear wheel steering device according to a deviation of the actual rear wheel steering angle from the modified computed target rear wheel steering angle, typically with a duty ratio control.

Thus, for instance, when the steering wheel is turned while the vehicle is stationary, and the steering load for the rear wheel steering actuator has exceeded the threshold value, the target value for the rear wheel actuator is reduced to a smaller value, and the actuator is therefore not required to have a very large output. Once the vehicle starts moving, the target rear wheel steering angle is either promptly or gradually restored to the normal value. Because the steering load normally promptly drops below the threshold value as soon as the vehicle starts moving, the rear wheels are immediately steered to the normal angle before the vehicle operator notices any effect of the limited power output of the rear wheel steering actuator. This equally applies to the case when the vehicle is travelling over a road surface having a high frictional coefficient, and a vigorous steering action is taken. In particular, when the modified computed target rear wheel steering angle is defined as a value which gradually diminishes with time, the change in the target rear wheel steering angle can be made particularly less noticeable to the vehicle operator.

When the load of the steering actuator has become greater than the prescribed threshold value, thereby causing the modified computed target rear wheel steering angle to be defined as a value smaller than the computed target rear wheel steering angle, and the load of the steering actuator has subsequently fallen below the prescribed threshold value, the modified computed target rear wheel steering angle is retained at a current value thereof, and is restored to the computed target rear wheel steering angle only when the load of the steering actuator has fallen below a second threshold value which is lower than the first threshold value. Thus, even if the load of the rear wheel steering actuator makes the sharp changes, the modified computed target rear wheel steering angle is prevented from making premature adjustments, and erratically fluctuating so that the control action for the rear wheel steering actuator may be carried out in a stable fashion.

According to a preferred embodiment of the present invention, when the load of the steering actuator is greater than the prescribed threshold value, the modified computed target rear wheel steering angle is set equal to a pre-defined value, for instance three degrees, if the computed target rear wheel steering angle is greater than the pre-defined value, and is set equal to a value which is obtained by multiplying a coefficient less than one to the computed target rear wheel steering angle if the computed target rear wheel steering angle is smaller than the pre-defined value. Typically, a high load condition most often occurs when the vehicle is stationary, and the target computed rear wheel steering angle can be sharply controlled without affecting the handling of the vehicle under such a condition. On the other hand, when the vehicle is travelling at a relatively high speed, any drastic change in the target computed rear wheel steering angle could strongly affect the handling of the vehicle. However, because the steering angle is relatively small, any excessive adjustment of the target computed rear wheel steering angle can be avoided. Therefore, according to this embodiment, a favorable control of the target computed rear wheel steering angle is possible at all times.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
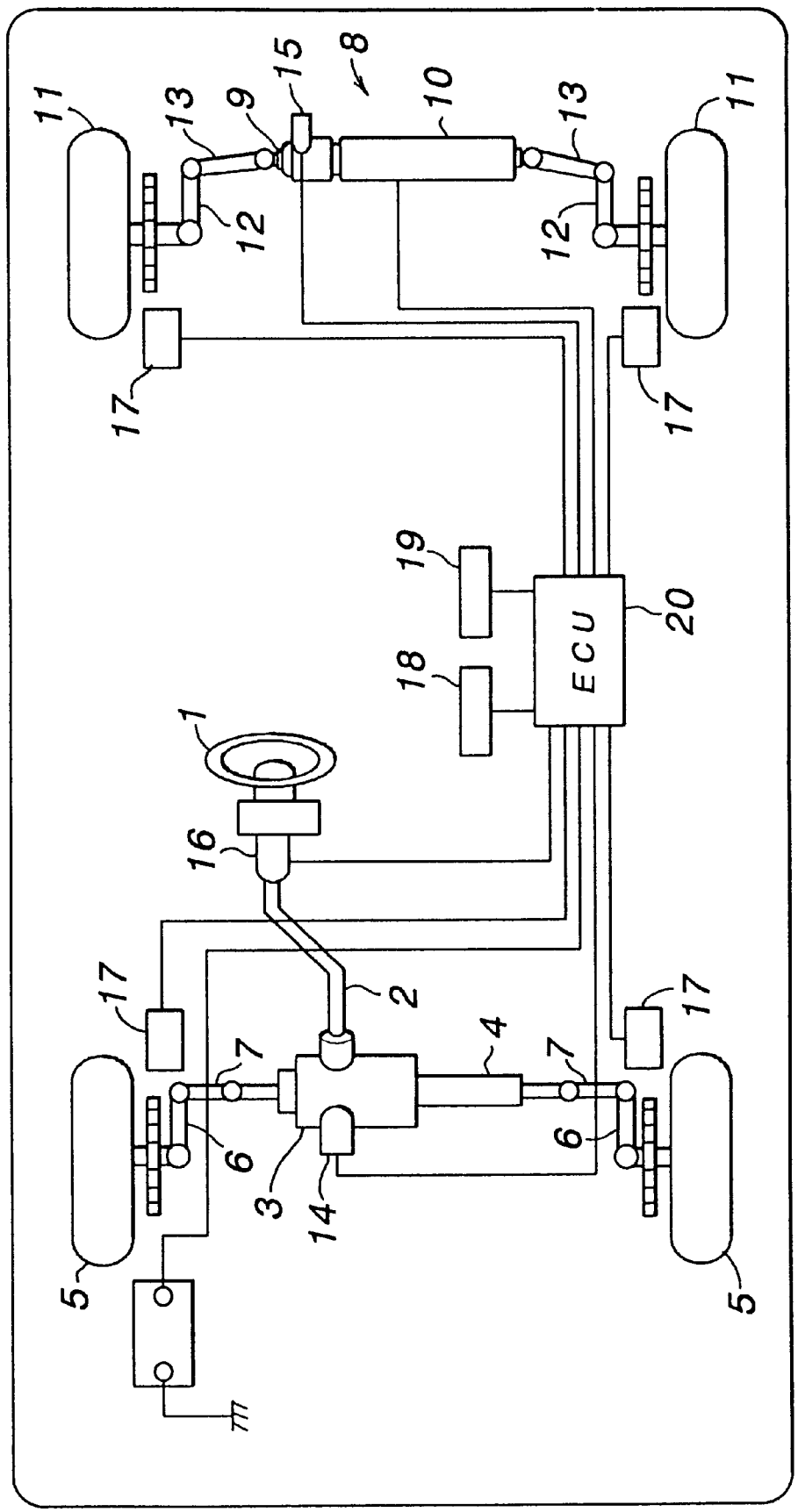
FIG. 1 is a schematic overall view of a four wheel steering vehicle to which the present invention is applied.

FIG. 1 shows the overall structure of a front and rear wheel steering device to which the present invention is applied. A steering wheel 1 is fixedly attached to the upper end of a steering shaft 2 which is in turn mechanically coupled to a steering rod 4 of a front wheel steering device 3 at its lower end. The two ends of the steering rod 4 are coupled to knuckle arms 6 of right and left front wheels 5 via tie rods 7, respectively.

A rear wheel steering device 8 is disposed in a rear part of the vehicle, and comprises an electric motor 10 for actuating a steering rod 9 extending laterally of the vehicle body. The two ends of the steering rod 9 are coupled to knuckle arms 12 of right and left rear wheels 11 via tie rods 13, respectively.

The front and rear wheel steering devices 3 and 8 are provided with steering angle sensors 14 and 15 for detecting the steering angles of the front and rear wheels 5 and 11 from the displacements of the steering rods 4 and 9, respectively. A steering angle sensor 16 is provided on the steering shaft 2 to detect the angle of the steering wheel 1. The wheels 5 and 11 are each provided with a vehicle speed sensor 17, and a lateral acceleration sensor 18 and a yaw rate sensor 19 are provided in suitable locations of the vehicle body. These sensors 14 to 19 are electrically connected to a computer unit 20 for controlling the operation of the electric motor 10.

According to this steering system, as the vehicle operator turns the steering wheel 1, the steering rod 4 of the front wheel steering device 3 is mechanically actuated, optionally, assisted by a power steering system, and the front wheels 5 are steered accordingly. At the same time, the steering angle of the steering wheel 1 and the displacement of the steering rod 4 are supplied to the computer unit 20 via the steering angle sensors 14 and 16. Thus, according to the input values of the front wheel steering angle, the vehicle speed, the lateral acceleration, and the yaw rate, the computer unit 20 determines the optimum steering angle of the rear wheels 11, and drives the electric motor 10 until the rear wheels 11 are steered to this optimum steering angle.

Figure 2:
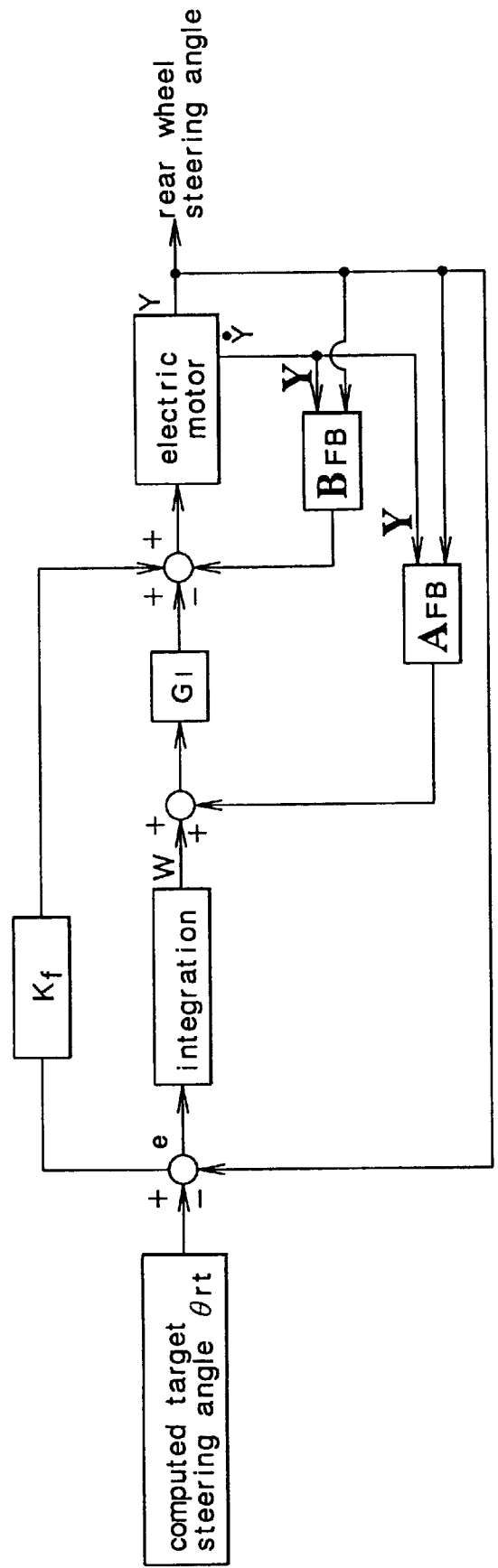
FIG. 2 is a block diagram of the control unit for the rear wheel steering device shown in FIG. 1.

Now the flow of the control action executed by the computer unit 20 is now described in the following with reference to FIGS. 2 and 7.

First of all, the main control action for actuating the rear wheel steering device 8 is described with reference to the block diagram given in FIG. 2. A target steering angle $\theta_{rt}$ is supplied to an input stage of this block diagram, and a deviation e of the actual steering angle Y obtained from the rear wheel steering angle sensor 15 from the target steering angle $\theta_{rt}$ is integrated over time. To the integrated deviation W is added $A_{FB} \cdot Y = A_{FB1} Y + A_{FB2} dY/dt$ (where $A_{FB}$ is a vector given by ($A_{FB1}, A_{FB2}$), and Y is a vector given by (Y, dY/dt)), and an integration gain $G_1$ is multiplied to this sum. The value Kf $\theta_{rt}$ (where Kf is a feed-forward coefficient) is added to this value, and $B_{FB} \cdot Y = B_{FB1} Y + B_{FB2} dY/dt$ (where $B_{FB1} = (B_{FB1}, B_{FB2})$) is subtracted from this value. The obtained value is supplied to the electric motor to actuate the rear wheel steering device.

Figure 3:
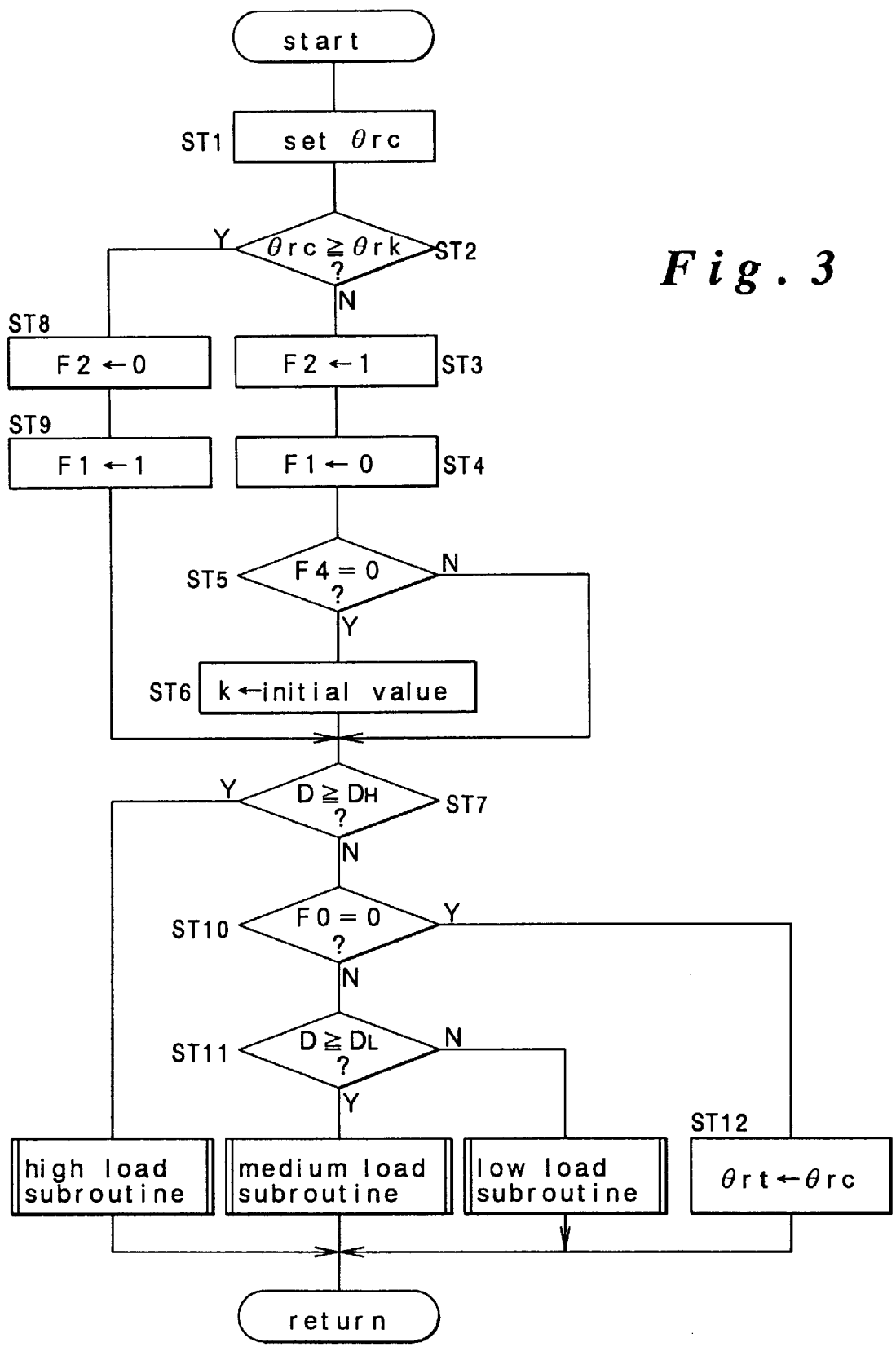
FIG. 3 is a flow chart showing a control flow of the main routine according to the present invention.

Now the main control flow is described in the following with reference to the main routine shown in FIG. 3.

A computed target steering angle $\theta_{rc}$ is determined in step ST1, and it is compared with a pre-defined steering angle $\theta_{rk}$ in step ST2. The computed target steering angle $\theta_{rc}$ can be determined according to any one of a number of methods which were previously proposed. For instance, reference should be made to U.S. Pat. No. 5,448,481 issued Sep. 5, 1995, and the contents of this United States patent are hereby incorporated in this application by reference. If the computed target steering angle $\theta_{rc}$ is smaller than the pre-defined steering angle $\theta_{rk}$, the program flow advances to step ST3 where a second flag F2 is set 2=1). Then, a first flag is reset (F1=0) in step ST4 before the program flow advances to step ST5. The second flag F2 when set indicates that the computed target steering angle $\theta_{rc}$ is smaller than the pre-defined steering angle $\theta_{rk}$. If the first flag F1 is set (F1=1), a pre-defined steering angle limiter is activated.

In step ST5, it is determined if a fourth flag F4 is set or not. The fourth flag F4 indicates a situation in which the computed steering angle $\theta_{rc}$ is smaller than the pre-defined steering angle $\theta_{rk}$, and a high load condition has been experienced. If the fourth flag F4 is set (F4=1), the program flow advances to step S17. If the fourth flag F4 is not set (F4=0), the program flow advances to step ST6 where a decrease coefficient k (which is described hereinafter) is reset to its initial value, and then to step ST7.

In step ST2, if the computed target steering angle $\theta_{rc}$ is equal to or greater than the pre-defined steering angle $\theta_{rk}$, the program flow advances to step ST8 where the second flag is reset (F2=0), and the first flag F1 is set (F1=1) in step 9 before the program flow advances to step ST7.

It is determined in step ST7 if an output duty ratio D, which indicates the magnitude of the steering load, is greater than a high load threshold value $D_H$ or not, and if the output duty ratio D is smaller than the high load threshold value $D_H$, the program flow advances to step ST10. The output duty ratio can be determined from the electric current supplied to the electric motor 10. It is determined in step ST10 if a high load flag F0 is set or not, and if the high load flag F0 is set (F0=1), the program flow advances to step ST11 where the output duty ratio D is compared with a low load threshold value $D_L$. Otherwise, the program flow advances to step ST12 where the output target steering angle $\theta_{rt}$ is given by the current computed target steering angle $\theta_{rc}$.

If it is determined in step S17 that the output duty ratio D is equal to or greater than the high load threshold value $D_H$, the program flow advances to a high load subroutine. If it is determined in step ST11 that the output duty ratio D is equal to or greater than the low load threshold value $D_L$, the program flow advances to a medium load subroutine. Otherwise, the program flow advances to a low load subroutine.

Thus, for instance, if the computed target steering angle $\theta_{rc}$ is greater than the pre-defined steering angle $\theta_{rk}$ (which, for instance, is three degrees), the program flow advances from step ST2 to step ST8 and then to steps ST9 and ST7. If it is determined in step ST7 that the high load condition exists, the program flow advances to the high load subroutine.

Figure 4:
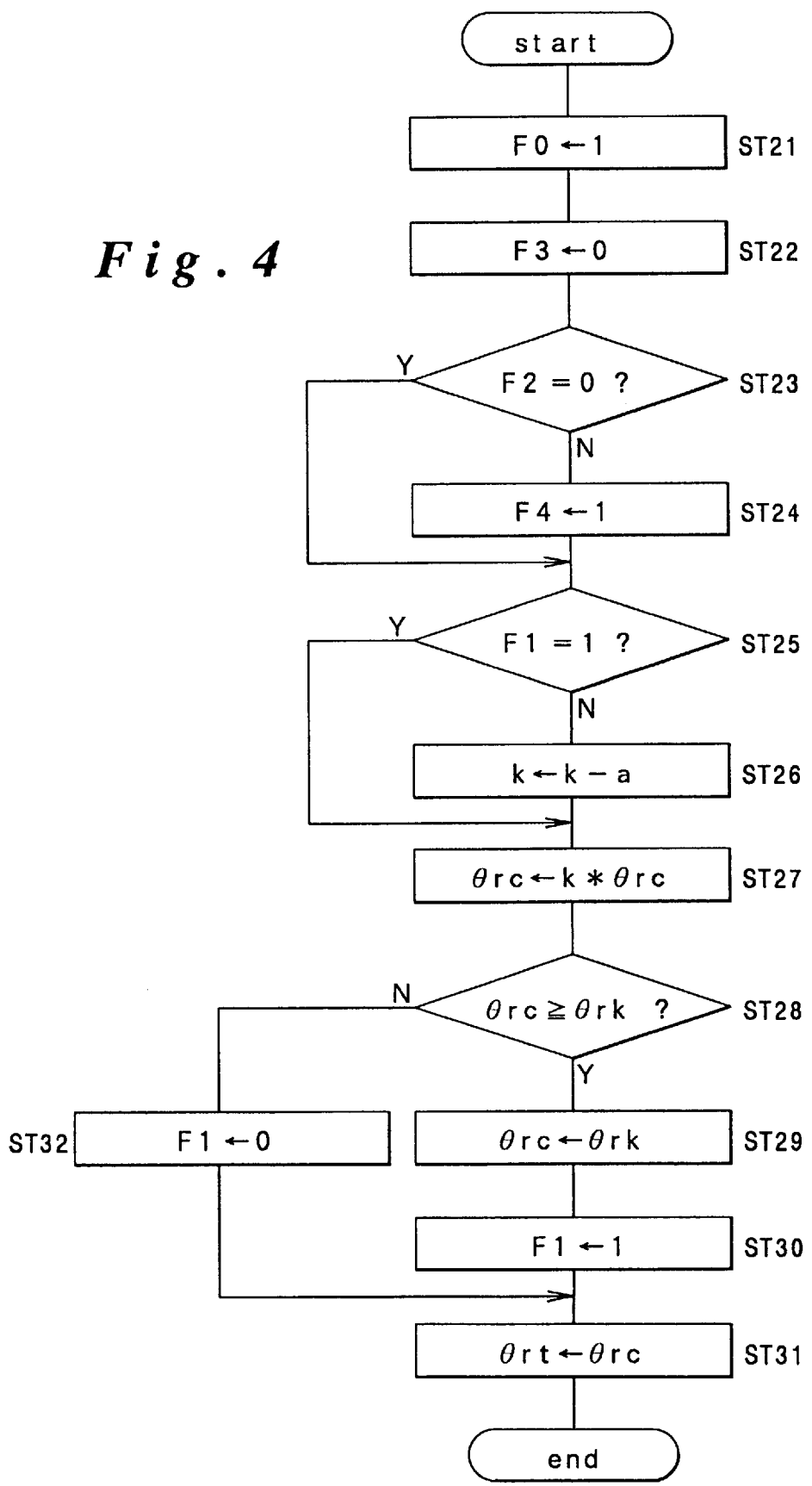
FIG. 4 is a flow chart showing a control flow of the high load subroutine according to the present invention.

Once the program flow has advanced to the high load subroutine, as shown in FIG. 4, the high load flag F0 is set (F0=1) in step ST21 to indicate that the high load condition currently exists. Then, a third flag F3 is reset (F3=0) in step ST22. The third flag F3 is for indicating the presence of the medium load condition. It is determined in step ST23 if the second flag F2 is set or not, and if the second flag F2 is set F2=1), the program flow advances to step ST24 to set the fourth flag F4 (F4=1), and then to step ST25. If it is determined in step ST23 that the second flag F2 is not set (F2=0), the program flow advances directly to step S125 without going through step ST24. It is determined in step ST25 if the first flag F1 is set or not, and if the first flag F1 is not set (F1=0), a decremental value a is subtracted from the decrease coefficient k (in step ST26) and the program flow advances to step ST27. If the first flag F1 is determined to be set in step ST25 (F1=1), the program flow advances directly to step 27 without going through step 26.

The computed target steering angle $\theta_{rc}$ is multiplied by the decrease coefficient k to obtain a modified computed target steering angle $\theta_{rc}$ in step ST27, and the program flow advances to step ST28. It is determined in step ST28 if the computed target steering angle $\theta_{rc}$ is equal to or greater than the pre-defined steering angle $\theta_{rk}$ or not, and if so, the program flow advances to step ST29 where the pre-defined steering angle $\theta_{rk}$ is set equal to the computed target steering angle $\theta_{rc}$. The first flag F1 is set (F1=1) in step S130, and the program flow advances to step ST31. If it is determined in step ST28 that the computed target steering angle $\theta_{rc}$ is smaller than the pre-defined steering angle $\theta_{rk}$, the program flow advances to step ST32 where the first flag F1 is reset (F1=0) before the program flow advances to step ST31. In either case, the computed target steering angle $\theta_{rc}$ is set as the output target steering angle $\theta_{rt}$ in step ST31 before concluding the high load subroutine.

Figure 5:
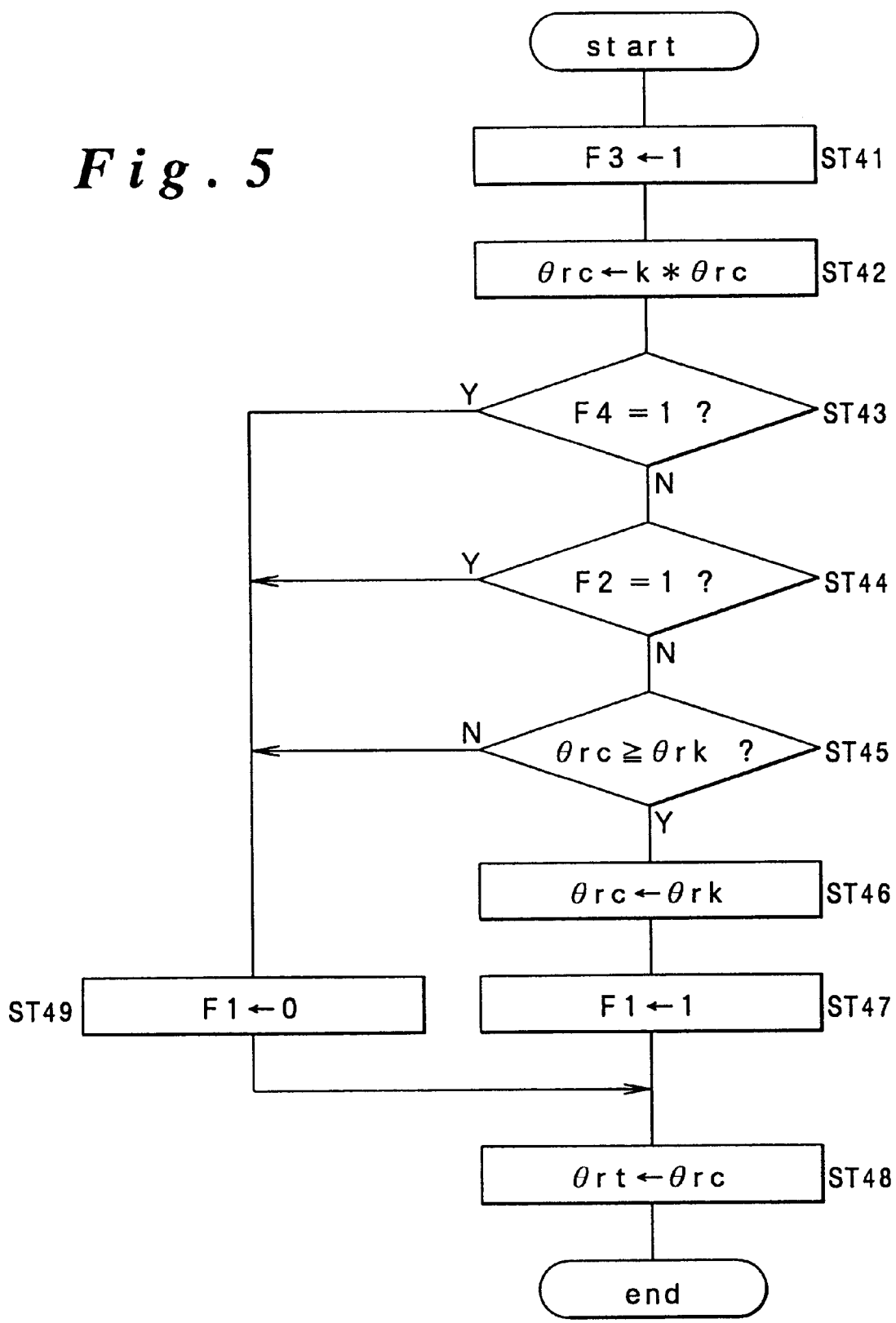
FIG. 5 is a flow chart showing a control flow of the medium load subroutine according to the present invention.

The medium load subroutine is described in the following with reference to FIG. 5. First of all, the third flag F3 is set (F3=1) in step ST41 to indicate that the medium load subroutine is currently in progress. The computed target steering angle $\theta_{rc}$ is multiplied by the decrease coefficient k to obtain a modified computed target steering angle $\theta_{rc}$ in step ST42, and the program flow advances to step ST43. It is determined in step ST43 if the fourth flag F4 is set or not, and if the fourth flag F4 is not set (F4=0), the program flow advances to step ST44. If it is determined in not step ST44 that the second flag F2 is set (F2=0), the program flow advances directly to step ST45.

It is determined in step ST45 if the computed target steering angle $\theta_{rc}$ is equal to or greater than the pre-defined steering angle $\theta_{rk}$ or not, and if so, the program flow advances to step ST46 where the computed target steering angle $\theta_{rc}$ is set equal to the pre-defined steering angle $\theta_{rk}$. The first flag F1 is set (F1=1) in step ST47, and the program flow advances to step ST48 where the output target steering angle $\theta_{rt}$ is set equal to the computed steering angle $\theta_{rc}$.

If it is determined in step ST43 that the fourth flag F4 is set (F4=1), if it is determined in step ST44 that the second flag F2 is set (F2=1), or if it is determined in step ST45 that the computed target steering angle $\theta_{rc}$ is smaller than the pre-defined steering angle $\theta_{rk}$, the program flow in either case advances to step ST49 where the first flag F1 is reset (F1=0) before the program flow advances to step ST48. Thus, the medium load subroutine is concluded.

Figure 6:
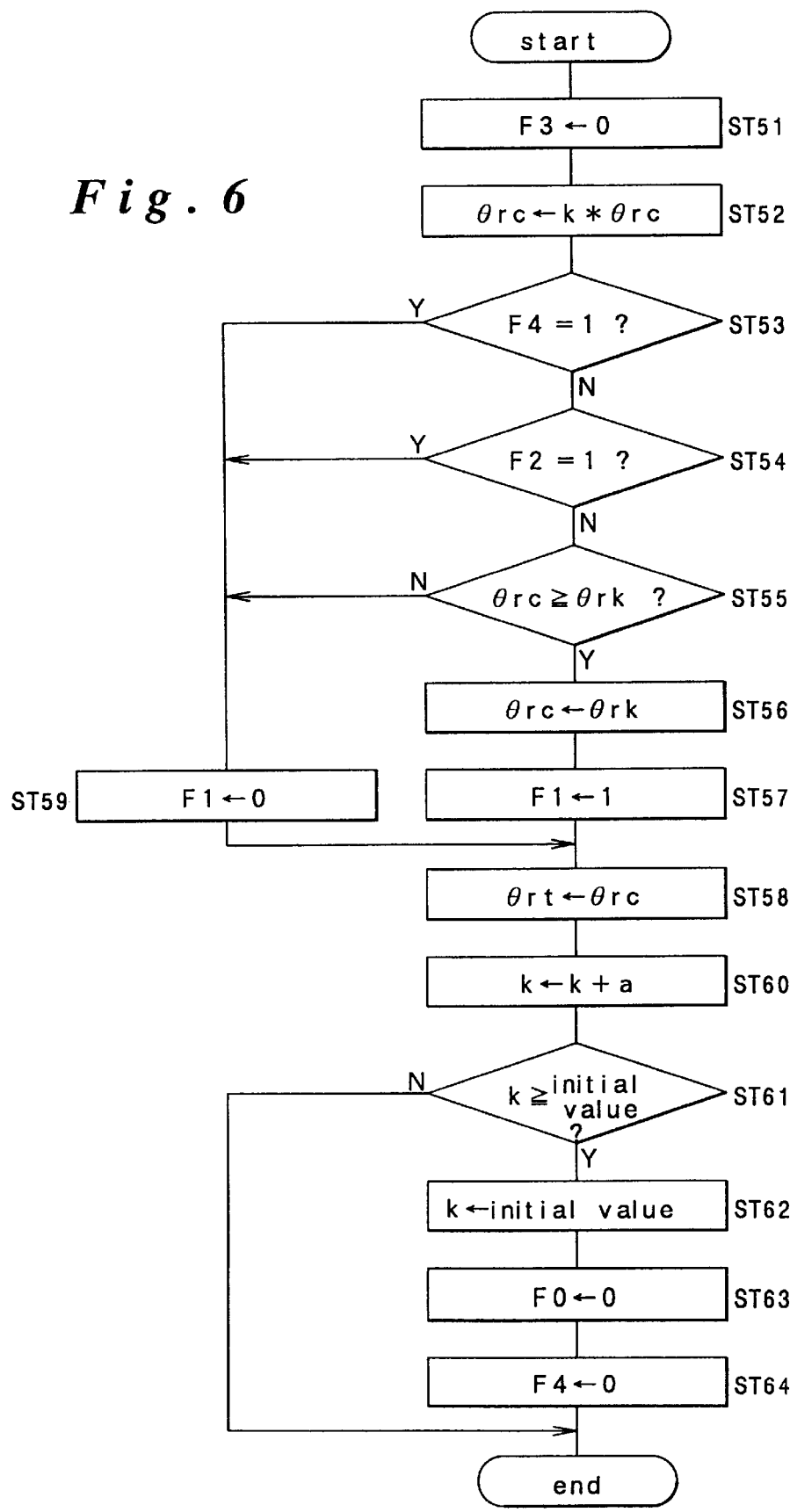
FIG. 6 is a flow chart showing a control flow of the low load subroutine according to the present invention.

The low load subroutine is described in the following with reference to FIG. 6. First of all, the third flag F3 is reset (F3=0) in step ST51 to cancel the indication that the medium load subroutine is in progress. The computed target steering angle $\theta_{rc}$ is then multiplied by the decrease coefficient k to obtain a modified computed target steering angle $\theta_{rc}$ in step ST52, and the program flow advances to step 53. It is determined in step ST53 if the fourth flag F4 is set (F4=1) or not, and if not, the program flow advances to step ST54 where it is determined if the second flag F2 is set (F2=1) or not. If the second flag F2 is not determined to be set in step ST54 (F2=0), the program flow advances to step ST55 where it is determined if the computed target steering angle $\theta_{rc}$ is equal to or greater than the pre-defined steering angle $\theta_{rk}$ or not. If so, the program flow advances to step ST56.

The computed target steering angle $\theta_{rc}$ is set equal to the pre-defined steering angle $\theta_{rk}$ in step ST56 before the program flow advances to step ST57 where the first flag F1 is set (F1=1). The program flow then advances to step ST58 where to the output target steering angle $\theta_{rt}$ is set equal to the computed steering angle $\theta_{rc}$. If it is determined in step ST53 that the fourth flag F4 is set (F4=1), if it is determined in step ST54 that the second flag F2 is set (F2=1), or if it is determined in step ST55 that the computed target steering angle $\theta_{rc}$ is smaller than the pre-defined steering angle $\theta_{rk}$, the program flow advances to step ST59 where the first flag F1 is reset (F1=0) before the program flow advances o step ST58.

The decrease coefficient k is restored to its initial value (k+a) by adding he prescribed decremental value a to the decrease coefficient k in step ST60 before the program flow advances to step ST61. It is determined in step ST61 if the decrease coefficient k is equal to or greater than its initial value or not, and if so, the program flow advances to step ST62 where the decrease coefficient k is set equal to its initial value before the program flow advances to step 63. The high load flag F0 is reset (F0=0) in step ST63, and the fourth flag F4 is reset (F4=0) in step ST64 before the low load subroutine is concluded. If it is determined in step ST61 that the decrease coefficient k is smaller than its initial value, the low load subroutine is concluded without going through the steps ST62 to ST64.

The control action of the above described embodiment is described in the following with reference to the time chart of FIG. 7. Suppose that the computed target steering angle $\theta_{rc}$ is smaller than the pre-defined steering angle $\theta_{rk}$. In the main routine, the program flow advances from step ST2 to ST3, and because the fourth flag F4 is not initially set (F4=0), the program flow further advances to steps ST5, ST6 and ST7. Conversely, if the computed steering angle $\theta_{rc}$ is equal to or greater than the pre-defined steering angle $\theta_{rk}$, the program flow advances to step ST7 via steps ST8 and ST9.

Figure 7:
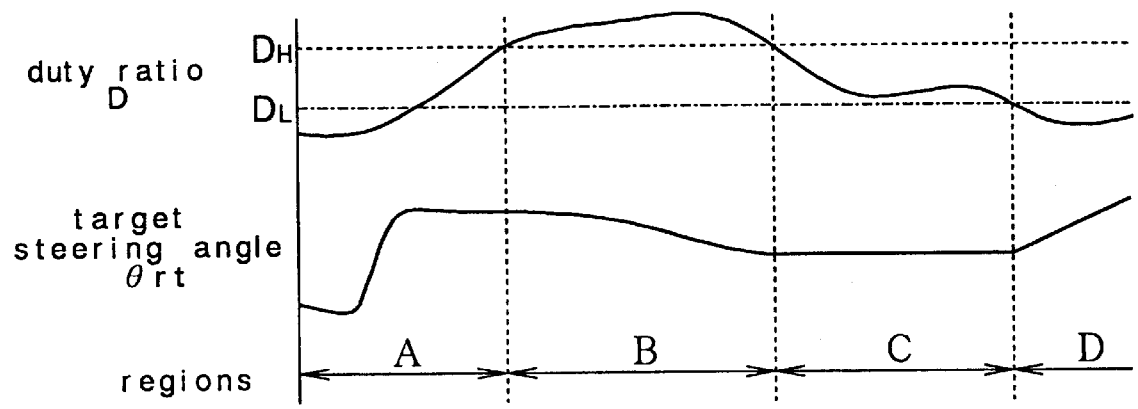
FIG. 7 is a conceptual graph showing different control modes according to the present invention.

If the current state is located in region A of FIG. 7 or if the output duty ratio D is smaller than the high load threshold value $D_H$, the program flow advances from step ST7 to step ST10, and because the high load flag F0 is not set (F0=0), the program flow further advances to step ST12 where the output target steering angle $\theta_{rt}$ is set equal to the computed steering angle $\theta_{rc}$ for the subsequent duty ratio control.

If the current state is located in region B of FIG. 7 or if the output duty ratio D is greater than the high load threshold value $D_H$, the program flow advances from step ST7 where it is determined that the output duty ratio D is greater than the high load threshold value $D_H$, to the high load subroutine. In the high load subroutine, the high load flag F0 is set (F0=1) in step ST21 as illustrated in FIG. 4 to indicate that the high load condition currently exists. In this case, the steering angle is small and the second flag F2 is therefore set (F2<1), the program flow advances from step ST23 to step ST24 where the fourth flag F4 is set (F4=1) to indicate that the steering angle is less than the predefined steering angle and that the high load condition currently exists.

Because the first flag F1 is not set (F1=0) in step S125, the program flow advances to step ST26 where the decrease coefficient k is decremented by the prescribed decremental value a (for instance, the initial value of k is 1.0 and the decremental value a is 0.1), and the computed target steering angle $\theta_{rc}$ is reduced accordingly. If it is determined in step ST28 that the computed target steering angle $\theta_{rc}$ is smaller than the pre-defined steering angle $\theta_{rk}$ or that the current steering angle is small, the program flow advances to step ST32 where the first flag F1 is reset, and the output target steering angle $\theta_{rt}$ is set equal to the computed steering angle $\theta_{rc}$ which has been modified or reduced in step S127.

The program flow then returns to the main routine. In step ST5, because the fourth flag F4 is set, the program flow bypasses step ST6. Therefore, the decrease coefficient k is not initialized. Then, as a result of the determination procedure in step ST7, as long as the output duty ratio is equal to or greater than the high load threshold value $D_H$, the program flow advances to the high load subroutine, and if the computed steering angle $\theta_{rc}$ is smaller than the pre-defined steering angle $\theta_{rk}$, the decrease coefficient k is gradually reduced as the program flow repeatedly passes through step ST26. The decrease coefficient k is thus positively reduced as indicated in region B of FIG. 7, and the output target steering angle $\theta_{rt}$ is accordingly reduced with the result that the output duty ratio D is reduced.

If the output duty ratio D has been reduced from the high load condition until it falls below the high load threshold value $D_H$, but it still is greater than the low load threshold value $D_L$, as indicated by region C in FIG. 7, the medium load condition is detected to be current. In other words, in the main routine, the program flow advances from step ST7 to step ST10, and because the high load condition has been experienced, the program flow advances from step ST10 to step ST11 where the program flow is directed to the medium load subroutine because the output duty ratio D is greater than the low load threshold value $D_L$.

In the medium load routine, because the high load condition has been experienced, and the fourth flag F4 has therefore been set, the program flow advances from ST43 to step ST49 and then to step ST48. At this point, the output target steering angle $\theta_{rt}$ is set equal to the computed steering angle $\theta_{rc}$ which has been defined under the high load condition. Therefore, the output target steering angle $\theta_{rt}$ is constant as indicated by region C of FIG. 7.

When the output duty ratio D drops from the medium load condition, and has fallen below the low load threshold value $D_L$, a low load condition is detected. In other words, in the main routine, the program flow advances from step ST11 to the low load subroutine. The current decrease coefficient k is multiplied to the computed steering angle $\theta_{rc}$ in step ST52 of the low load subroutine, and if the program flow has progressed as indicated in FIG. 7, and the fourth flag F4 is therefore set, the program flow advances from step ST53 to step ST59 and then to step ST58, in a similar manner as in the medium load subroutine. The decrease coefficient k is increased by the prescribed value a in step ST60, and if the decrease coefficient k has not exceeded the initial value in step ST61, the program flow bypasses steps ST62 to ST64. In this manner, the computed steering angle $\theta_{rc}$ is gradually restored as indicated in region D of FIG. 7.

Thereafter, the low load subroutine is executed, and once the decrease coefficient k has exceeded the initial value in step ST61, the program flow advances from step ST61 to step ST62, and the decrease coefficient k is set equal to the initial value. In the subsequent steps ST63 and ST64, the high load flag F0 and the fourth flag F4 are reset. If the program flow has returned to the main routine after the high load flag F0 is reset, the program flow advances from step ST10 to step ST12, and the normal control action is executed as indicated by region A of FIG. 7.

If it is determined in step ST28 that the computed target steering angle $\theta_{rc}$ is equal to or greater than the pre-defined steering angle $\theta_{rk}$ (or that the rear wheels are steered by a large steering angle while the vehicle is substantially stationary, for instance), the program flow advances to step ST29. In this case, because the computed target steering angle $\theta_{rc}$ is set equal to the pre-defined steering angle $\theta_{rk}$ (for instance, three degrees), the output target steering angle $\theta_{rt}$ is set equal to a limited steer angle which is substantially smaller than the value which is produced when a high load condition does not hold. In this way, the steering angle of the rear wheels can be suitably controlled when the steering wheel is turned by a large angle while the vehicle is substantially stationary.

Thus, according to the present invention, the steering angle of the rear wheels is suitably controlled under a high load condition so that any indefiniteness in the steering angle of the rear wheels can be avoided even when the output of the actuator for steering wheels is limited. This however does not substantially affect the handling of the vehicle. When the steering wheel is turned by a large angle while the vehicle is stationary, the small reduction in the steering angle of the rear wheels is not noticeable to the vehicle operator. Furthermore, as soon as the vehicle starts moving, the rear wheels are quickly steered to the initially designed angle, and the vehicle operator can hardly detect any change in the turning behavior of the vehicle. If the vehicle is turned sharply on a road surface having a high frictional coefficient, the vehicle simply demonstrates a slight under-steer tendency without substantially affecting the handling of the vehicle, and it may even contribute to the stabilization of the handling of the vehicle.

Thus, according to the present invention, because the steering angle of the rear wheels is slightly limited when the steering load is high, the power requirement of the actuator for the rear wheel steering device can be reduced, and the cost and the size of the steering device can be reduced. In particular, by gradually reducing the target steering angle, the rear wheels can be steered without disturbing the handling of the vehicle. Also, by changing the extent of limiting the steering angle of the rear wheels or by multiplying a certain coefficient less than one depending on the magnitude of the steering angle under a high load condition, it is possible to adapt the control procedure for the rear wheel steering device in an optimum fashion.

Although the present invention has been described in terms of a specific embodiment thereof, it is possible to modify and alter details thereof without departing from the spirit of the present invention.

What we claim is:

1. A method for controlling a rear wheel steering device of a front and rear wheel steering vehicle, comprising the steps of:

computing a target rear wheel steering angle according to an operating condition of a vehicle;

detecting an actual rear wheel steering angle;

detecting a load of a steering actuator of said rear wheel steering device;

defining a modified computed target rear wheel steering angle which is smaller than said computed target rear wheel steering angle when said load of the steering actuator is greater than a prescribed threshold value, and which is otherwise equal to said computed target rear wheel steering angle; and actuating said steering actuator of the rear wheel steering device according to a deviation of said actual rear wheel steering angle from said modified computed target rear wheel steering angle.

2. A method for controlling a rear wheel steering device according to claim 1, wherein, when said load of the steering actuator is greater than said prescribed threshold value, said modified computed target rear wheel steering angle is defined as a value which gradually diminishes with time.

3. A method for controlling a rear wheel steering device according to claim 1, wherein, when said load of the steering actuator has become greater than said prescribed threshold value, thereby causing said modified computed target rear wheel steering angle to be defined as a value smaller than said computed target rear wheel steering angle, and said load of the steering actuator has subsequently fallen below said prescribed threshold value, said modified computed target rear wheel steering angle is retained at a current value thereof, and is restored to said computed target rear wheel steering angle only when the load of the steering actuator has fallen below a second threshold value which is lower than said first threshold value.

4. A method for controlling a rear wheel steering device according to claim 1, wherein said steering actuator of the rear wheel steering device is controlled by a duty ratio control based on said deviation of said actual rear wheel steering angle from said modified computed target rear wheel steering angle.

5. A method for controlling a rear wheel steering device according to claim 1, wherein, when said load of the steering actuator is greater than said prescribed threshold value, said modified computed target rear wheel steering angle is set equal to a pre-defined value when said computed target rear wheel steering angle is greater than said pre-defined value, and as a value which is obtained by multiplying a coefficient less than one to said computed target rear wheel steering angle when said computed target rear wheel steering angle is smaller than said pre-defined value.

* * * * *

UNITED STATES PATENT AND TRADEMARK OFFICE
CERTIFICATE OF CORRECTION

PATENT NO. : 6,073,067
DATED : 06 June 2000
INVENTOR(S) : Yukihiro Fujiwara, Osamu Tsurumiya It is certified that error appears in the above-indentified patent and that said Letters Patent is hereby corrected as shown below:

Column 2, line 55, change "makes the" to --makes--.
Column 4, 25th line, change "$B_{FB1} = (B_{FB1}, B_{FB2})$" to --$B_{FB} = (B_{FB1}, B_{FB2})$--;
    40th line, change "set 2 = 1)." to --set (F2 = 1).--;
    51st line, change "S17" to --ST7--.
Column 5, line 7, change "S17" to --ST7--;
    29th line, change "F2 = 1)" to --(F2 = 1)--;
    32nd line, change "S125" to --ST25--;
    line numbered 49, change "S130" to --ST30--;
    line numbered 67, delete "not".
Column 6, line 1, before "set" insert --not--;
    25th line, change "step 53" to --step ST53--;
    38th line, change "where to" to --where--;
    45th line, change "o step" to --to step--;
    48th line, change "he" to --the--;
    line numbered 55, change "step 63" to --step ST63--.
Column 7, 22nd line, change "(F2 < 1)" to --(F2 = 1)--;
    24th line, change "predefined" to --pre-defined--;
    26th line, change "S125" to --ST25--;
    37th line, change "S127" to --ST27--.

Signed and Sealed this

Third Day of April, 2001

*Attest:*

NICHOLAS P. GODICI

*Attesting Officer*   Acting Director of the United States Patent and Trademark Office